United States Patent [19]

Tsujimoto et al.

[11] 4,021,822
[45] May 3, 1977

[54] ELECTRICALLY CONTROLLED SHUTTER

[75] Inventors: Kayoshi Tsujimoto, Osaka; Toru Matsui, Sakai, both of Japan

[73] Assignee: Minolta Camera Kabushiki Kaisha, Japan

[22] Filed: June 30, 1975

[21] Appl. No.: 591,939

Related U.S. Application Data

[63] Continuation-in-part of Ser. No. 555,421, March 5, 1975, abandoned, which is a continuation of Ser. No. 429,802, Jan. 2, 1974, abandoned.

[30] Foreign Application Priority Data

Dec. 30, 1972 Japan .................................. 48-124

[52] U.S. Cl. .................................. 354/31; 354/51; 354/60 R
[51] Int. Cl.[2] .......................................... G03B 7/08
[58] Field of Search .............. 354/31, 50, 51, 60 R; 356/222

[56] References Cited

UNITED STATES PATENTS

| 3,678,825 | 7/1972 | Nobusawa | 354/31 |
| 3,864,699 | 2/1975 | Tsunekawa et al. | 354/31 |

Primary Examiner—L. T. Hix
Assistant Examiner—J. A. LaBarre
Attorney, Agent, or Firm—Craig & Antonelli

[57] ABSTRACT

An improvement is made in a camera wherein the exposure is controlled by an electronic circuit comprising a photoelectric element so situated as to receive a light reflected from the surface of photographic film in the camera.

Conventional shortcomings of the above-mentioned camera that a time delay from operation of the electronic switching circuit to an actual completion of closing of the already opened shutter has been liable to cause an over-exposure and that an exposure period shorter than the delay has been impracticable can be eliminated by employing another photoelectric element which continuously receives a light from the object and influences a current to flow into a timer circuit.

Moreover, by means of a change-over switch, the circuit is switched so as to be controlled substantially by the second photoelectric element in case the photographic object is so bright as to necessitate a high speed exposure faster than the time delay.

21 Claims, 14 Drawing Figures

ELECTRICALLY CONTROLLED SHUTTER

CROSS REFERENCES TO RELATED APPLICATIONS

This application is a continuation-in-part of our copending application Ser. No. 555,421 filed Mar. 5, 1975, which is a continuation of our copending application Ser. No. 429,802 filed Jan. 2, 1974, both now abandoned.

BACKGROUND OF THE INVENTION

Hitherto, there has been used a camera wherein the exposure period is controlled by an electronic timing circuit comprising a photoelectric element which is so situated as to receive light reflected from the surface of photographic film in the camera. Such a camera has the advantage that the exposure is very exact, and that there is no need to compensate the γ-character of the photoelectric element as described in our copending U.S. application Ser. No. 327,856 of Jan. 29, 1973, which is a continuation of U.S. application Ser. No. 54,130 of July 13, 1970, which is assigned to the assignee of the pending application. A further advantage resides in the fact that the information relating to the opening and closing of the shutter and aperture of the diaphragm is directly applied to the photoelectric element. However, such a camera has, on the other hand, shortcomings in that the exposure is liable to be excessive due to a time delay from a switching motion of the electronic circuit to an actual closing of the shutter, and that it is impossible to obtain an exposure period shorter than the above-mentioned delay period, and that it is impossible to give the camera user an indication of the exposure and an alarm against under-or over-exposures before the shutter is released, since the light measurement starts only after the opening of the shutter blades.

Moreover, as is well known, there are two kinds of shutters, namely lens shutters and focal-plane shutters. In the cameras with a focal plane shutter, a photosensitive element of the TTL system (through the lens system) is placed in front of a shutter screen, so that the photosensitive element can receive incident light before the shutter is opened. Accordingly, in such focal-plane shutter camera, the electronic exposure control system is responsive to an objective brightness detected prior to, simultaneously with, and subsequent to start of a shutter opening. Therefore, any delay in the photoelectric and electromechanic shutter control system does not adversely affect the exposure.

However, in the conventional lens shutter camera, the photosensitive element receives incident light only after the shutter opening. Therefore, in the lens-shutter cameras, any delay of the operation of the electromagnet causes adverse effect on the precision of the exposure obtained.

SUMMARY OF THE INVENTION

This invention serves to provide a camera of the above-mentioned tuype, wherein the above-mentioned shortcomings are eliminated, and wherein an exact, as well as, very short exposure period is obtainable. The present invention also serves to provide an improved lens-shutter camera, wherein its exposure control system is capable of responding to the brightness prior to the start of shutter opening, and also the brightness subsequent to the start of shutter opening. In order to attain such a purpose this invention utilizes a second photosensitive element D2 situated so as to receive light whether or not the shutter is open or closed.

BRIEF EXPLANATION OF THE DRAWINGS

FIGS. 4($a$) to 4($c$) are side views of an electromagnet M and the switch S2 at various stages of operation;

FIGS. 10($a$)–10($c$) are side views of an electromagnet M and switch S2' at various stages of operation of the circuit of FIG. 9.

DETAILED DESCRIPTION OF THE INVENTION

Figure 1:
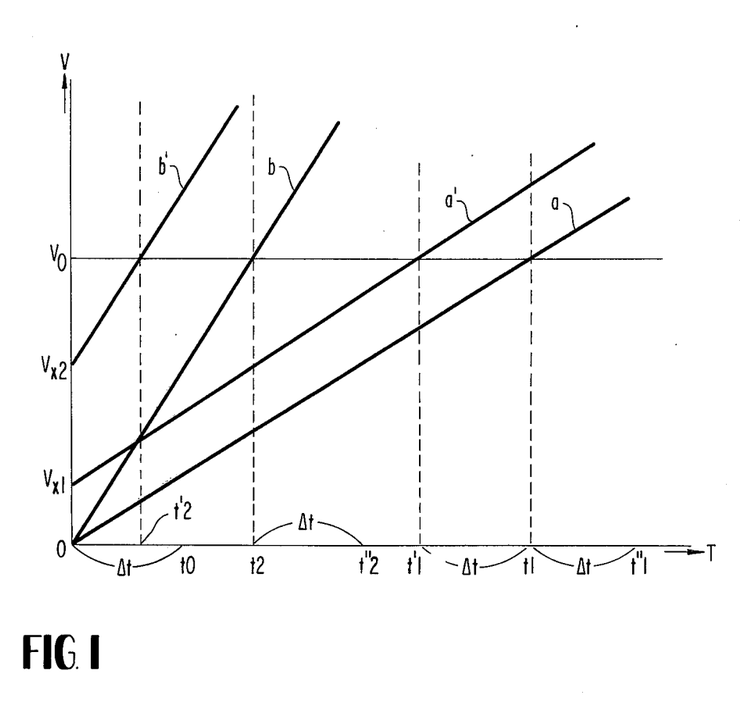
FIG. 1 is a chart which illustrates the principle of the present invention.

In electronic circuits for shutter-controlling, in general, the exposure time, i.e., the period of exposure, more particularly, the time of shutter-closing is controlled by a timer circuit consisting of a photoelectric element and a timing capacitor. FIG. 1 shows the relation between a time T from the time of start of charging, which time T is graduated on the abscissa, and a voltage V of the timing capacitor, which voltage V is graduated on the ordinate. Curves $a$ and $b$ show voltages across the capacitor (hereinafter designated as C1) charged through the photoelectric element (hereinafter designated as D1) which is situated inside the camera so as to receive the light reflected from the film during the opening of the shutter. The curve $a$ is for a dark photographic object, and the curve $b$ is for a bright photographic object.

A voltage $V_o$ indicates the voltage above which a switching circuit in the electronic circuit is switched. As shown in FIG. 1, the switching circuit switches at a time $t1$ or $t2$ for the curves $a$ or $b$, respectively. However, due to delay from the excitation to the actual switching of a relay in the circuit and due to a mechanical delay in the shutter mechanism, the shutter closes at a time $t1''$ or $t2''$, for dark or bright objects, respectively, delaying by a small delay period $\Delta t$.

In the present invention, in order to eliminate this delay period $\Delta t$ a preliminary voltage $Vx1$ or $Vx2$ for the C1 curve $a$ or curve $b$, respectively, is applied to the capacitor prior to the start of charging from the time 0. By so applying the preliminary voltage $Vx1$ or $Vx2$ to the capacitor C1 prior to the start of main charging for the case of curve $a$ or curve $b$, the voltage across the capacitor C1 is raised to a curve $a'$ or a curve $b'$, respectively, and therefore, the voltage across the capacitor C1 reaches the value $V_o$ at the time $t1'$ or $t2'$, which is prior to the time $t1$ or $t2$ by the period $\Delta t$, respectively. Thus the aforementioned delay period $\Delta t$ is eliminated.

As shown in FIG. 1, the brighter the photographic object is, the steeper the inclination of the time-voltage curve is, and for this reason it is necessary to increase the preliminary voltage applied to the capacitor in proportion to the brightness.

Now provided that the photoelectric element, for instance, a photo-diode receives light from the photoelectric object of a constant brightness, the current flowing through the photo-diode to the timing capacitor can be considered substantially constant during the opening period of the shutter, because a constant current circuit is generally provided in the timing circuit of the shutter control circuit.

Now, provided that the current $i$ is flowing through the photo-diode, the period from the time $t = 0$ at which time no charge exists in the capacitor of capacity C, the voltage across the capacitor reaches the switching level Vo at the time $t1$, and the electric charge at the time $t1$ is Q, the following relation holds:

$$Vo = \frac{Q}{C} = \int_0^{t1} idt/C = it1/C \qquad (1)$$

Alternately, if the capacitor has been preliminarily charged to a voltage Vx1 at the time $t = 0$, then the following relation holds:

$$Vo = Vx1 + (Vo - Vx1) = Vx1 + \int_0^{t1'} idt/C = Vx1 + it1'/C \qquad (2)$$

where $t1' = t1 - \Delta t$ is the time when the voltage reaches the value of Vo from the voltage Vx1.

Accordingly, from the equations (1) and (2)

$$Vx1 = Vo - \frac{it1'}{C} = \frac{i}{C}(t1 - t1') = i \cdot \frac{\Delta t}{C},$$

and accordingly, $$Vx1 = k \cdot i \qquad (3)$$

holds, where $k$ is a constant.

Since $i$ is the current flowing through the photo-diode which measures the luminosity of the light reflected from the film, the current $i$ is proportional to the luminosity of the photographic object, since the $\gamma$-value of the photo-diode is considered substantially 1. Accordingly, the preliminary voltage Vx1 or Vx2 should be set to be proportional to the luminosity of the photographic object.

Figure 2:
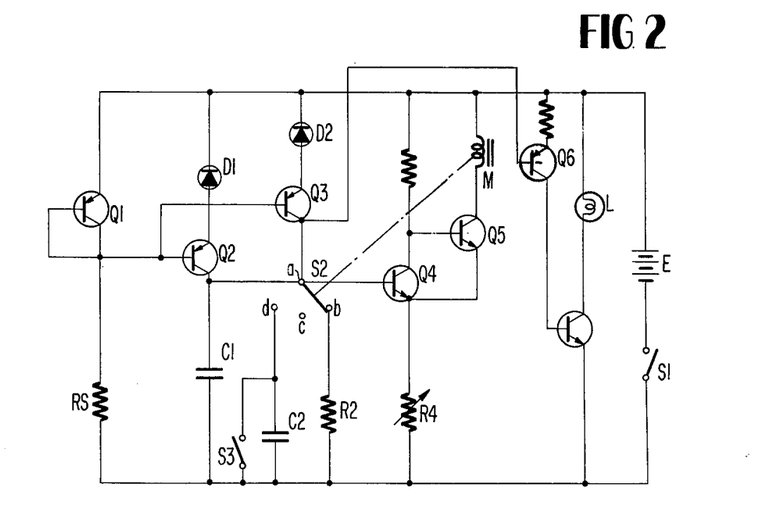
FIG. 2 is the circuit diagram of a first example of the present invention.

The preferred embodiments of the present invention are explained in detail in the following:

In FIG. 2, the base and the collector of a transistor Q1 are connected in common so as to serve as a diode and the diode is connected in series to a resistor Rs across a D.C. power source E. The common-connected collector and base of the transistor Q1 are connected to the bases of transistors Q2 and Q3, so that the base potentials of the transistors Q2 and Q3 are not affected by undesirable drifts of the voltage of the D.C. source E. A photodiode D1 for receiving the light reflected from the film face, the transistor Q2 and the capacitor C1 are connected in series across the D.C. source E. Therefore, the current which flows through the photodiode D1 to charge the capacitor C1 is so controlled as to be proportional to the exposure of the face of a film F, but to be independent from the undesirable drift of the source voltage.

Another diode D2 for receiving the light from the photographic object, the transistor Q3 and the capacitor C1 are also connected in series across the D.C. source E, so that the current flowing through the photodiode D2 to charge the capacitor C1 is so controlled as to be proportional to the luminosity of the photographic object, but to be independent from the undesirable drift of the source voltage.

Figure 3:
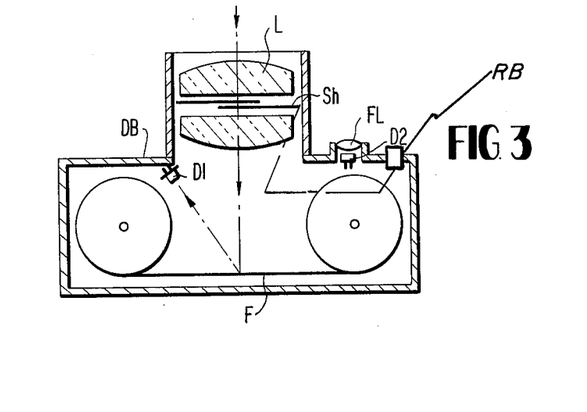
FIG. 3 is a schematic sectional plan view of the camera of the present invention.

The diodes D1 and D2 are provided, as shown in FIG. 3, inside and outside, relatively, of a dark box DB which contains the film. The inside photo-diode D1 is situated inside the dark box DB so as to receive the light reflected from the film F, but no to obstruct the light from a lens L to the film F. The outside photodiode D2 is situated so as to receive the light from the photographic object through a suitable focusing lens FL.

Transistors Q4 and Q5 are connected to form a Schmitt trigger circuit (a switching circuit), the input terminal of which is connected to the capacitor C1, so that the Schmitt trigger circuit is switched by the voltage across the capacitor C1 and controls an electromagnet M connected thereto. The electromagnet M is linked with a known mechanical means for retaining the shutter that has been previously opened by a known shutter-releasing operation, so that the shutter is retained open until the transistor Q5 turns to the OFF state. Namely, upon the turn-On of the transistor Q4 and resultant turn-OFF of the transistor Q5, the shutter is closed.

A transistor Q6 is provided for controlling a warning lamp $L_p$, for indication of a long exposure, in such a manner that the lamp $L_p$ is lit when the photographic object is dark and the potential at the point $a$ (i.e., voltage across the capacitor C1) is lower than a predetermined level. When the lamp $L_p$ is lit the user should know he must use a tripod for a long exposure or otherwise a flash-lamp.

A variable resistor R4 is connected in series to the common-connected emitters of the transistors Q4 and Q5, and is for adjusting the switching level of the Schmitt trigger circuit corresponding to the photographic sensitivity (ASA sensitivity, etc.) of the film used.

A switch S1 is a power switch which is actuated to turn the circuit ON upon pushing the shutter release button RB of the camera.

Figure 4A:
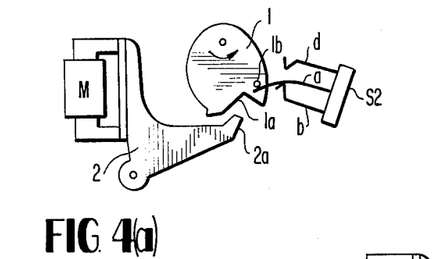
Figure 4B:
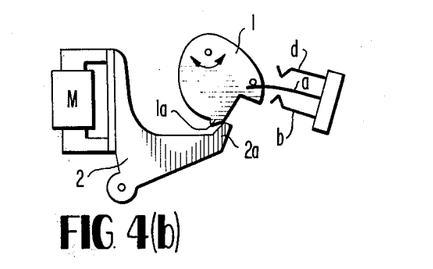
Figure 4C:
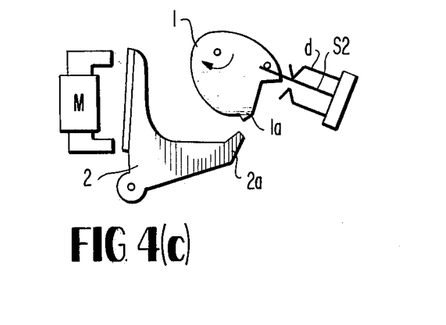

A switch S2 is constituted to be controlled by a cam 1 which is interlocked with the electromagnet M, as illustrated in reference to FIG. 4(a) to (c). At first, namely, prior to pressing the release button RB, the switch S2 is turned to its contact $b$ as shown in FIG. 2 as well as in FIG. 4(a). A resistor R2 is connected between the contact $b$ and the negative end of the power source E. A second capacitor C2 and a switch S3 are connected between another contact $d$ and the negative end of the power source E. In the switch S2, at a position $c$ situated between the contacts $b$ and $d$, the point $a$ or a moving arm $a$ is not connected to any place.

The switch S3 is so constituted as to open slightly before opening of the shutter blades, by, for instance, considerably overlapping the shutter blades Sh, as shown in FIG. 3, so that switch S3 will open before the shutter.

The charging current through the diode D1 is selected to be sufficiently greater than that of the diode D2, and the capacitance of the capacitor C1 is selected to be sufficiently greater than that of the capacitor C2.

OPERATION

When the release button RB is pressed, the switch S1 becomes closed at a first position of the pressing stroke thereof. Since the switch S2 has been turned to the contact b and the shutter Sh is not yet opened, only the photodiode D2 allows a preliminary current to flow into the resistor R2, while the other photodiode D1 has very high resistance. As a result of this current, a voltage which is proportional to the luminosity of the outside photographic object appears at the point a. This voltage is memorized in the timing capacitor C1 as the aforementioned preliminary voltage.

For a dark object (Exposure period > $\Delta t$)

In the case where the photographic object is dark so that the exposure period is required to be longer than the aforementioned delay period $\Delta t$, the voltage at the point a is below the preset level Vo, and therefore, the transistor Q4 is OFF and the transistor Q5 is ON, and the electromagnet M is energized. On account of this energization, the moving end of the lever 2 is attracted to the electromagnet M as shown in FIG. 4(a).

When the release button RB is further pressed to a second position of its stroke, by means of a known linking mechanism (not shown in FIG. 4) the cam 1 is turned counter-clockwise. Since the lever 2 has been attracted to the electromagnet M, the cam 1 stops when a detent 1a of the cam 1 touches a detent 2a of the lever 2 as shown in FIG. 4(b). Therefore, the switch S2 is turned to the no-connection position c.

When the release button RB is further pressed to its final stroke, the shutter Sh (shown in FIG. 3) is released with the aforementioned delay $\Delta t$ to expose the film F to the light through the lens L, and the inside photodiode D1 receives the light reflected from the film F. Accordingly, the capacitor C1 is charged by the current flowing through the photodiode D1. When the voltage of the capacitor C1 is charged up to the preset switching level Vo at the time $t1'$, the transistor Q4 turns ON and the transistor Q5 turns OFF, and the electromagnet M is deenergized. Upon this deenergization, the hitherto opened Sh is closed.

For bright objects (Exposure period < $\Delta t$)

In case where the photographic object is bright so that an exposure period is required to be shorter than said delay period $\Delta t$, the potential of the point a is above the preset level Vo, and therefore, transistor Q4 is ON and the transistor Q5 is OFF from the beginning, and the electromagnet M is not energized. On account of this deenergization, the moving end of the lever 2 is separated from the electromagnet M as shown in FIG. 4(c).

Accordingly, when the release button RB is pressed to the second position of its stroke, the cam 1 can freely turn until its final position shown in FIG. 4(c) without obstruction of the aforementioned touching of the detents 2a and 1a of the lever 2 and the cam 1, respectively. Therefore, the switch S2 turns to its contact d as shown in FIG. 4(c). At this time, since the shutter Sh is still closed the switch S3 is also closed, and therefore, the charge in the capacitor C1 is discharged through the switch S2 and the switch S3, resultantly turning the transistor Q4 OFF and the transistor Q5 ON, respectively, and hence energizing the electromagnet M.

Then, by further pressing the release button RB to the final position, the shutter Sh is released to open.

Prior to opening of the shutter, the switch S3 is opened as aforementioned, and the capacitors C1 and C2 are charged by the charging current through the photodiode D2. Therefore, the potential at the point a again reaches the preset voltage Vo. Since the shutter is still closed and the photodiode D1 had high resistance, the time (tv–ts of FIG. 5) from opening of the switch S3 to the voltage reaching Vo depends on the luminosity of the photographic object. Then, the shutter Sh is opened.

When the voltage of the point a reaches Vo, the transistors Q4 and Q5 turn ON and OFF, respectively, deenergizing the electromagnet M. Therefore, the shutter Sh is closed at the time t2 which is after delay period $\Delta t$ from said deenergization at the time $t2'$.

Figure 5:
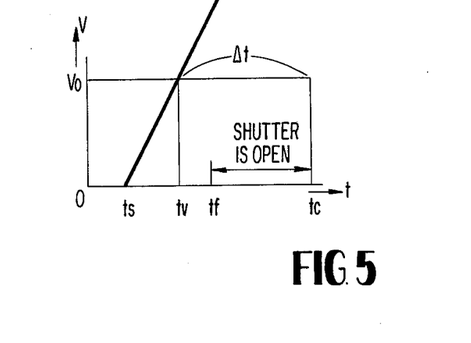
FIG. 5 is a time-voltage chart explaining the operation of a high speed exposure.

FIG. 5 shows the time chart illustrating the above-mentioned operation. The abscissa is graduated by the time from closing of the power switch S1, and the ordinate is graduated by the potential of the point a. At the time 0 the power switch S1 is closed, then at the time ts the switch S3 is opened, and the voltage of the point a rises as shown by the thick solid line, to reach the predetermined switching level Vo at the time tv. After a short period from the time tv the shutter Sh starts to open at the time tf. After the delay period $\Delta t$ from the time tv, namely at the time tc, the shutter Sh is closed.

Thus, a very short exposure period tf-tc shown in FIG. 5, which is shorter than the delay period $\Delta t$, is obtainable. In this case, the voltage at the point a already has reached Vo prior to the shutter opening, and therefore, the charging current through the inside photodiode D1 to the capacitor C1 does not affect the operation.

Figure 6:
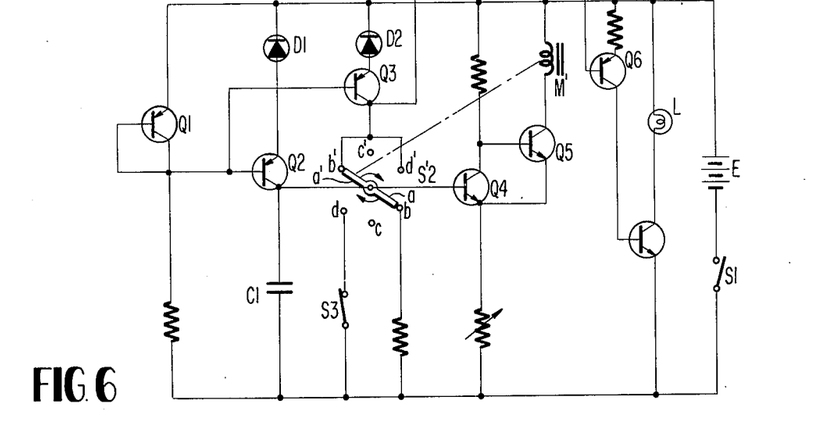
FIG. 6 is a circuit diagram of a second example of the present invention.

FIG. 6 shows a second embodiment, wherein a switch S2' consists of a pair of mutually interlocked switches which are the same as the aforementioned switch S2. The pair of contacts b and b', as well as the contact d and d' are simultaneously connected to the moving contacts a and a'.

Figure 7:
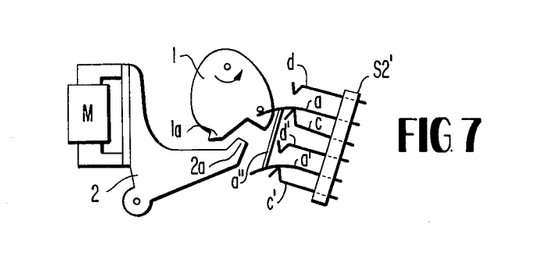
FIG. 7 is a side view of an electromagnet M and the switch S2' at a stage of operation.

One example of the construction of switch S2' is shown in FIG. 7. Both moving contacts a and a' are linked by an insulated linking piece a'' for the interlocked motion.

In this example, by adopting the above-mentioned interlocked switch S2', the second capacitor C2 can be omitted. The pair of contacts b and b', and the pair d and d' are touched by both the moving contacts a and a' similarly to touching of the contacts b and d by a, respectively.

Figure 8:
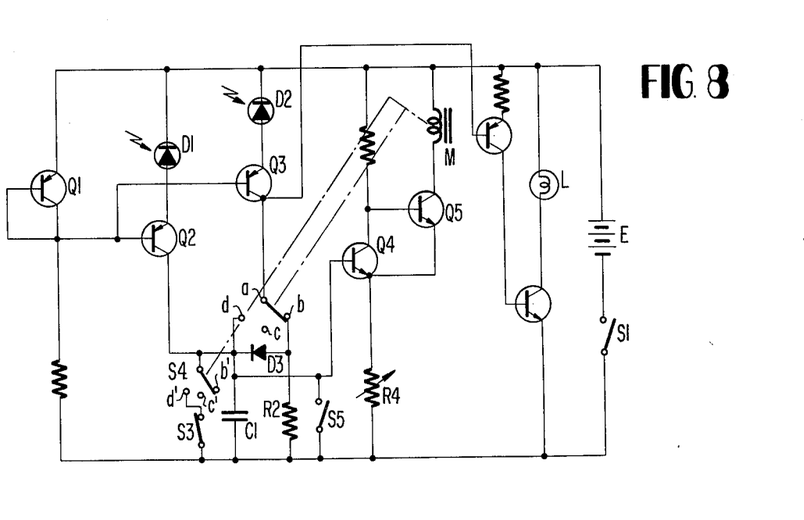
FIG. 8 is a circuit diagram of a third example of the present invention.

FIG. 8 shows a third embodiment, wherein the switch S2 operates similarly to the switch S2 of the first example of FIG. 2. Another switch S4 is interlocked with the switch S2 so that contact d' is closed only when the contact d of the switch S2 is closed. The switch S3, which operates similarly to the switch S3 of the first example, is connected in series with the switch S4 across the capacitor C1. The contact d of the switch S2 is connected to the collector of the transistor Q2. The capacitor C1 is connected between the contact d and the negative end of the power source E. Across the capacitor C1 is connected a resetting switch S5 which is constituted to open when the shutter is cocked and is closed when the shutter is closed, by a known mechanism.

OPERATION

When the release button RB is pressed, the switch S1 becomes closed at a first position of the pressing stroke.

Since the switch S2 has been turned to the contact b and the shutter Sh is not yet opened, only the photodiode D2 allows a preliminary current to flow, through the switch S2 (contact b) to the resistor R2, while the other photodiode D1 has very high resistance. As a result of this current, the capacitor C1 is charged to a voltage which is proportional to the luminosity of the photographic object through the diode D3 and the voltage is stored in the capacitor C1.

For dark objects (Exposure period > Δt)

In such a case the voltage stored in the capacitor C1 is below the preset level Vo, and the resetting switch S5 has been opened already, and therefore the transistor Q4 is OFF and the transistor Q5 is ON, and the electromagnet M is energized. On account of this energization the moving end of the lever 2 is attracted to the electromagnet M as shown in FIG. 4(a).

When the release button RB is further pressed to a second position of its stroke, the cam 1 is turned counter-clockwise. Since the lever 2 has been attracted to the electromagnet M, the cam 1 stops when a detent 1a of the cam 1 touches a detent 2a of the lever 2. Therefore, the switch S2 is turned to the no-connection position c.

When the release button RB is further pressed to its final stroke, the shutter Sh (shown in FIG. 3) is released to expose the film F to the light through the lens L, and the inside photodiode D1 receives the light reflected from the film F. Accordingly, the capacitor C1 is charged by the current flowing through the photodiode D1. When the voltage of the capacitor C1 is charged up to the preset switching level Vo at the time t1', the transistor Q4 turns ON and the transistor Q5 turns OFF, and the electromagnet M is deenergized. Upon the deenergization of the electromagnet M, the hitherto opened shutter Sh is closed.

For bright objects (Exposure period < Δt)

In such case, the potential of the point a is above the preset level Vo when the switch S2 is connected to the contact b, and therefore, transistors Q4 is ON and the transistor Q5 is OFF from the beginning, and the moving end of the lever 2 is separated from the electromagnet M, as shown in FIG. 4(c).

Accordingly, when the release button RB is pressed to the second position of its stroke, the cam 1 can freely turn, and the switches S2 and S4 turn to their contacts d and d', respectively, as shown in FIG. 4(c). At this time, since the shutter Sh is still closed the switch S3 is also closed, and therefore, the charge in the capacitor C1 is discharged through the switch S4 and the switch S3, consequently turning the transistor Q4 OFF and the transistor Q5 ON, respectively, and hence energizing the electromagnet M.

Then, by further pressing the release button RB to the final position, the shutter Sh is released to open. Prior to opening of the shutter, the switch S3 is opened as aforementioned, and the capacitor C1 is charged by the charging current through the photodiode D2. Therefore, the voltage across the capacitor C1 reaches the preset voltage Vo. Since the shutter is still closed, and the photodiode D1 has high resistance, the time (tv–ts of FIG. 5) from the opening of the switch S3 to the voltage reaching Vo depends on the luminosity of the photographic object. Then, the shutter Sh is closed.

When the voltage of the capacitor C1 reaches Vo, the transistors Q4 and Q5 turn ON and OFF, respectively, deenergizing the electromagnet M. Therefore, the shutter Sh is closed at the time t2 which is after the delay period Δt from said deenergization at the time t2'.

As the final step, the resetting switch S5 is closed after closing of the shutter Sh.

Figure 9:
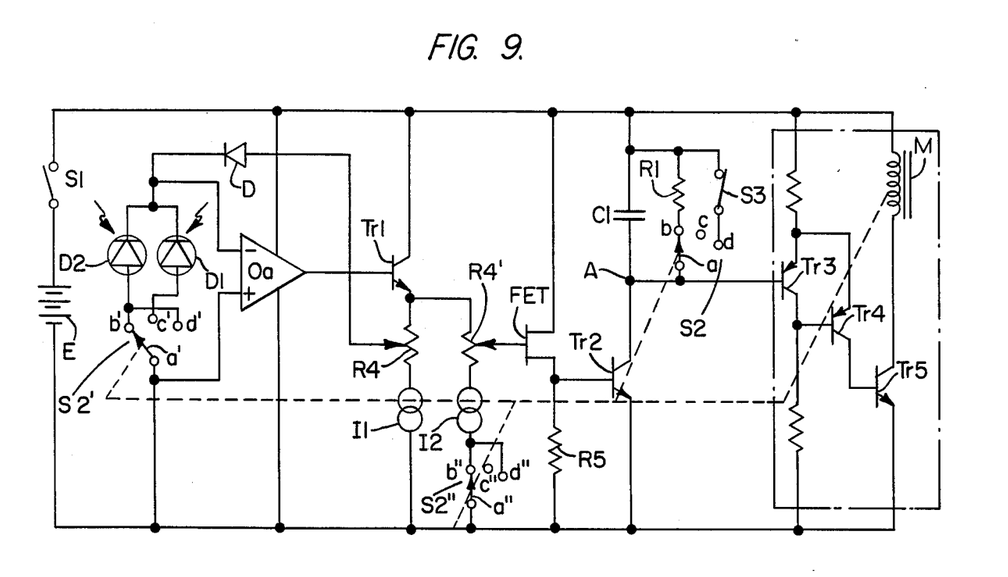
FIG. 9 is a circuit diagram of a fourth example of the present invention.

As a further embodiment of the present invention the circuit of FIG. 9 has the feature that aperture value information Av is given by presetting the variable resistor R4'. In FIG. 9, a photoelectric diode D1 is disposed to receive the light traversed the objective lens L and a shutter Sh and reflected from the face of the film F. A photoelectric diode D2 is disposed to directly receive the light independently from the operation of the shutter Sh. R4 is a variable resistor for setting film sensitivity, R4' is a variable resistor for setting aperture value, and I1, I2 are constant current sources. Change-over switches S2' and S2" are linked to the change-over switch S2, and movement of these switches S2, S2', and S2" is limited by the electromagnet M. Before the shutter releases the moving arm a, a', and a" of the switches S2, S2' and S2" are touching b, b' and b", respectively.

Figure 10A:
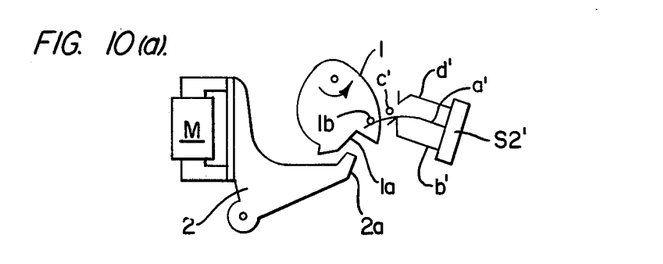
Figure 10B:
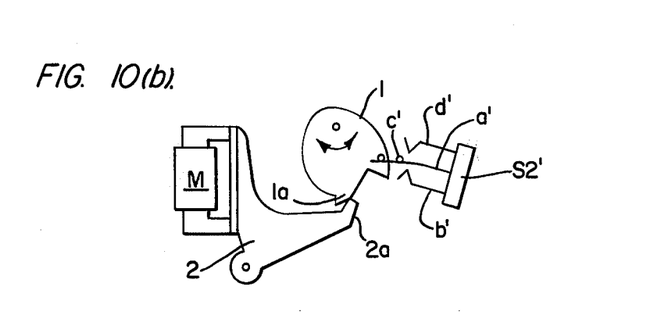
Figure 10C:
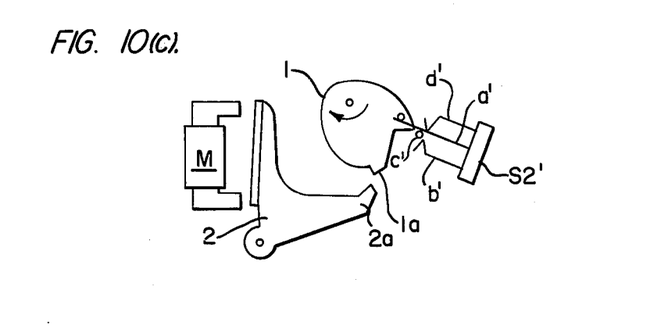

Tr3, Tr4, Tr5 and M constitute a control circuit for limiting the movement of S2, S2' and S2". The release-button-linked switch S2' is constituted as shown in FIG. 10 (a) to (c). When the electromagnet M is energized, the cam 1 can rotate from the state of FIG. 10(a), only to that of FIG. 10(b). In the state shown in FIG. 10 (b), the moving arm a' advances and contacts the midway contact c', so as to ground one end of the diode D1. When the electromagnet M is deenergized, the cam 1 is allowed to further rotate to the state shown in FIG. 10 (c), and the moving arm a' separates from the contact c' and touches the contact d'.

Operation of the circuit of FIG. 9

Before the shutter releases, the circuit is connected as shown in FIG. 9, the base of the transistor Tr1 receiving the input current which corresponds to the objective brightness detected by the photoelement (a photo diode) D2. As a result, by means of the logarithmic compression function of the diode D, which is connected between the cathodes of the photoelectric elements D1 and D2 and the sliding arm of the variable resistor R4, the gate of the FET receives a voltage corresponding to the Tv (Time value in APEX indication). The time value Tv is defined by the following equation:

$$Tv = Bv + Sv - Av,$$

wherein
 Bv = luminance value
 Sv = film sensitivity value, and
 Av = aperture value,
The information Bv is supplied to the circuit in the form of current flowing through the diode D2. The information Sv is supplied to the circuit in the form of the resistance of the variable resistor 4 or position of the slidinng arm of R4. The information Av is supplied to the circuit in the form of the resistance of the variable resistance R4' or position of sliding arm of R4'.

When a voltage corresponding to the above-mentioned Tv value is supplied to the gate of the FET, a current corresponding to the gate voltage flows through the resistor R5 connected to the source of the FET, and the voltage across the resistor R5 is supplied to the base of the transistor Tr2. Then, by means of logarithmexpanding function of Tr2, a collector current corresponding to logarithm-expanded value for the base voltage flows through the collector of Tr2. At that time, in the switch S2, the moving contact *a* touches the contact *b*, and, therefore, the collector current flows through the resistor R1. Therefore, the capacitor C1 is charged by a voltage across both ends of the resistor R1 by the collector current.

Now, provided that the potential at the point *a* is higher than a preset level (namely, the objective brightness is insufficient for good exposure with preset sensitivity and aperture) after the charging up of the capacitor C1 in the above-mentioned manner, then the transistor Tr3 is turned off and the transistors Tr4 and Tr5 are turned on and, therefore, the electromagnet M is energized. Accordingly, when the shutter release button RB is pressed, the switches S2, S2' and S2" advance and stop at the midway positions making the moving arm *a*' touch the contact *c*'.

As the shutter release button RB is pressed farther down and the shutter is released, the photoelectric element D1 receives the light through the lens and shutter and a current generated in the photoelectric element D1 causes the operation amplifier O*a* to supply current to the base of the transistor Tr1. At this time, in the switch S2", the contact *a*" is at a non-connection position *c*" and, therefore, the setting of the variable resistor R4' is independent of the operation of the transistor Tr1. However, since the photoelectric element D1 receives the light through the shutter, the current output of the photoelectric element D1 includes both the aperture value information A*v* and the brightness value information B*v*. Therefore, the gate of the FET receives a voltage corresponding to this value.

$Tv = Bv + Sv - Av$ and, accordingly, the collector current of the transistor Tr2 is a current corresponding to a logarithmexpansion of the value T*v*. By means of this current, the capacitor C1 is further charged until the potential at the point A is lowered to a preset level, at which level the transistor 3 is turned on and the electromagnet M is turned off or deenergized. Upon this deenergization, the hitherto opened shutter S*h* is closed. In this embodiment, the collector circuit of the transistor Tr2 has a high resistance to the capacitor C1 and, therefore, the charge of the capacitor C1 corresponds precisely to the total of a previous charging corresponding to the current by the diode D2 and the sequential charging corresponding to the current by the diode D1. Therefore, the charge of the capacitor contains information for both photoelectric elements D1 and D2.

Next, provided that the potential at the point A is lower than the preset level, (namely, the objective brightness is sufficient to obtain a good exposure) after the charging up of the capacitor C1, the transistor Tr3 is turned on, and therefore, the electromagnet M is deenergized. Accordingly, when the shutter button is pressed, the switches S2, S2' and S2" freely reach the contacts *d*, *d'* and *d*", respectively. Therefore, the charge of the capacitor C1 is discharged by a short-circuit through switches S3 and S2, thereby energizing the electromagnet M. As the shutter release button RB is pressed farther down, then, immediately before the shutter releasing, the switch S3 opens. Accordingly, the capacitor C1 starts to be charged by a collector current corresponding to the output of the photoelectric element D2. As the capacitor C1 is charged up, the potential of the point A is lowered. When the potential crosses the preset level, the electromagnet M is deenergized, thereby closing the shutter.

In the above-mentioned operations, for a case of sufficient brightness, the collector current corresponds to a logarithm-expansion of the T*v* value for the selected element D2. In this case, no aperture value informaton is included in the output current of D2, but the preset resistance value of R4' (which is linked with the aperture diaphragm) is included as information to effect the collector current, in lieu of said aperture value information.

The above-mentioned embodiment of FIG. 9 has the following features:

1. The photoelectric elements i.e., photodiodes D1 and D2 are employed in a manner that both ends of each photo diode are at the same potential, and 2. By means of the interlocked switches S2' which selectively connects either photodiode D1 or D2, and by the variable resistor R4' interlocked to the aperture diaphragm, the aperture value information is obtained for shutter control.

While we have shown and described several embodiments in accordance with the present invention, it is understood that the same is not limited thereto but is susceptible of numerous changes nd modifications as known to a person skilled in the art and we therefore do not wish to be limited to the details shown and described herein but intend to cover all such changes and modifications as are obvious to one of ordinary skill in the art.

We claim:

1. In a timing circuit comprising a timing capacitor and a first photoelectric element connected so as to charge said timing capacitor by the output thereof when exposed to light from an object, which circuit is used for a camera having an objective and containing film, said camera being arranged for exposing said film to the light and said objective being arranged for focusing the light on said film, a housing structure in which said film is to be contained and said first photoelectric element is disposed so as to receive the light which traversed said objective and a shutter and reflected from the face of said film, said shutter being operable to an opened position for permitting the light to enter into the inside of said housing structure through said objective for exposure of said film in response to shutter release operation and to a closed position for shielding said inside of said housing structure for preventing said film from lights except in said exposure, said first photoelectric element charging said timing capacitor only when said shutter is in said opened position and shutter control means connected by an input terminal to said timing capacitor for operating said shutter to said closed position when voltage at said input terminal reaches a predetermined level, the improvement further comprising a second photoelectric element connected to said input terminal in operatively parallel relation with said first photoelectric element, so as to charge said timing capacitor by the output thereof, said second photoelectric element being disposed in a manner to directly receive the light independently from the operation of the shutter so as to charge said timing capacitor before said shutter is operated to said opened position.

2. A camera circuit according to claim 1, wherein said timing capacitor and said parallel connection of first and second photoelectric elements are connected in series across a voltage source.

3. A camera circuit according to claim 2, wherein said shutter control means includes an electromagnet operatively associated with said shutter and trigger means responsive to the voltage level at said input terminal, said electromagnet being deenerigized by said trigger means to trigger said shutter to move to said closed position when the voltage level at said input terminal reaches said predetermined level.

4. A camera circuit according to claim 2, wherein said camera further includes a release button manually operable when preset from a resting position through a first position to a second position and a switch means for controlling supply of the electric power of said voltage source to said first and second photoelectric elements, said release button when operated to said second position causing said shutter to operate to said opened position, said switch means being normally open and being closed to supply the electric power to said first and second photoelectric elements in response to the manual operation of said release button to said first position.

5. A camera circuit according to claim 1, further comprising means for discharging said timing capacitor when the voltage level at said input terminal reaches said predetermined level before said shutter operates to said opened position.

6. A camera circuit according to claim 3, further comprising means for discharging said timing capacitor and switch means operatively associated with said electromagnet and said discharging means, said switch means connecting said timing capacitor across said discharging means upon deenergization during a shutter release operation of said electromagnet.

7. A camera circuit according to claim 6, further including a resistor and a second capacitor each connected to said one side of said voltage source, and switch means responsive to said electromagnet for sequentially connecting said imput terminal to said resistor and said second capacitor.

8. A camera circuit according to claim 7, further including second switch means connected across said second capacitor and opened for a short time by said shutter control means for a short time prior to opening of said shutter.

9. A camera circuit according to claim 2, wherein said first and second photoelectric elements are connected to said input terminal by first and second transistor circuits, respectively, which regulate the charging current through said first photoelectric element to be substantially greater than the charging current through said second photoelectric element.

10. A camera circuit according to claim 3, further including a resistor and a switch each connected to said one side of said voltage source, and switch means responsive to said electromagnet for sequentially connecting said input terminal to said resistor and said switch.

11. A camera circuit according to claim 3, further including a diode and a resistor connected in series between said input terminal and said one side of said voltage source, and switch means responsive to said electromagnet for switching said second photoelectric element from a point between said diode and said resistor to said input terminal.

12. A camera circuit according to claim 9, further comprising a controlling means for controlling said first and second transistor circuits for supplying constant currents respectively so as to exclude affection by undesirable drifts of the voltage of said voltage source.

13. In a photographic camera having an electrically controlled shutter system, the shutter system including a shutter normally closed to shield the inside space of the camera from light incident from a photographic object, a first photoelectric element positioned inside the camera so as to receive light reflected from the film face when said shutter is opened and a circuit having a timing capacitor to be charged through said first photoelectric element, which circuit causes the shutter to close after a time dependent upon the output of said first photoelectric element from an opening thereof, the improvement comprising a second photoelectric element which is positioned to receive light directly from the photographic object and is electrically connected to said timing capacitor to apply thereto a preliminary voltage proportional to the luminosity of the photographic object.

14. A camera according to claim 13, wherein said circuit comprises a switch which, for the preliminary voltage exceeding a prescribed level, switches the circuit connection to allow said circuit connection to be controlled by said second photoelectric element.

15. A photographic camera comprising:
a housing structure having a space for containing the film;
an objective for focusing light from an object onto said film contained in said space;
a shutter operable to an opened position for permitting the light to enter into said space through said objective for exposure of said film in response to shutter release operation and to a closed position for shielding said space from the light for preventing said film from exposure;
shutter control means having an input terminal and operating said shutter mechanism to said closed position in response to the voltage level at said input terminal;
a timing capacitor connected to said input terminal;
a first photoelectric element disposed between said shutter and said film in said space of said housing structure so as to receive the light traversing said shutter and reflected from the face of said film only when said shutter is in said opened position;
a second photoelectric element disposed outside of said housing structure so as to receive the light directly;
means for generating a voltage responding to the output level of said second photoelectric element; and
switch means responsive to said generating means, said switch means selectively connecting said second photoelectric element to said timing capacitor when the voltage level of said generating means is higher than a predetermined level and said first photoelectric element to said timing capacitor when the voltage level of said generating means is lower than the predetermined level, respectively before said shutter is operated to said opened position.

16. A photographic camera according to claim 15, further comprising means for indicating the voltage level of said generating means.

17. A camera which comprises:
an objective lens system;
a housing structure in which a film is to be contained;

a shutter operable between an opened position and a closed position;

light detecting means including a first photoelectric element disposed in said housing structure so as to receive a light from an object traversing said lens system and said shutter and reflected from the face of said film and a second photoelectric element disposed outside of said housing structure so as to receive said light directly from said object, said first and second photoelectric elements being capable of generating outputs respectively representative of said light received thereby and said light detecting means being capable of generating currents proportional to said outputs;

resistance means connected to said light detecting means;

capacitance means connected to said light detecting means;

first switch means operable between a first position for connecting said resistance means in parallel to said capacitance means and a second position for disconnecting said resistance means from said capacitance means;

second switch means operable between a first position for connecting said second photoelectric element to said light detecting means and a second position for connecting said first photoelectric element to said light detecting means, said first and second switch means being normally in said first position so that, when said shutter is in said closed position, said capacitance means is charged by said current proportional to said output of said second photoelectric element until voltage thereacross becomes equal to that which arises across said resistance means;

switch operating means for operating said first and second switch means to said second position prior to the operation of said shutter to said opened position when said voltage across said resistance means is lower than a given level so that said capacitance means is further charged by said current proportional to said output of said first photoelectric element;

shutter closing means for operating said shutter from said opened position to said closed position when said voltage across said capacitance means reaches said given level after the operation of said shutter to said opened position;

means for reducing said current proportional to said output of said second photoelectric element by an amount dependent on diaphragm aperture to be set; and third switch means operable between a first position for rendering said reducing means operative and a second position for rendering said reducing means non-operative, said third switch means being normally in said first position, and said switch operating means being also capable of operating said third switch means to said second position prior to the operation of said shutter to said opened position when said voltage across said resistance means is lower than said given level.

18. The camera as set forth in claim 17, wherein said switch operating means, when said voltage across said resistance means is higher than said given level, is capable of operating said first to third switch means to a third position in which said first switch means discharges said capacitance means, said second switch means connects said second photoelectric element to said light detecting means, and said third switch means renders said recuding means operative, and wherein there is further provided fourth switch means connected between said first switch means and said capacitance means, said fourth switch means being normally closed and opened immediately prior to the operation of said shutter to said opened position but after completion of the discharge of said capacitance means by said first switch means, whereby said capacitance means is recharged by said current proportional to said output of said second photoelectric element in response to the opening of said fourth switch means when said voltage across said resistance means is higher than said given lever prior to the operation of said first to third switch means to said third position.

19. The camera as set forth in claim 18, further comprising means for increasing said currents proportional to said outputs of said first and second photoelectric elements by an amount dependent on sensitivity of film to be contained in said housing structure.

20. The camera as set forth in claim 19, wherein said light detecting means includes:
first conversion means for generating voltages proportional to logarithmic values of said outputs; and
second conversion means for generating said currents proportional to inverse logarithmic values of said voltages generated by said first conversion means.

21. The camera as set forth in claim 20, wherein said reducing means and said increasing means are connected to said first conversion means so as to reduce and increase said voltages generated by said first conversion means by said respective amounts, and said third switch means disconnects said reducing means from said first conversion means when in said second position.

* * * * *